United States Patent [19]

Saito et al.

[11] Patent Number: 4,689,689
[45] Date of Patent: Aug. 25, 1987

[54] IMAGE SENSING APPARATUS

[75] Inventors: Syuichiro Saito; Nobuaki Date; Nobuo Tezuka; Tadashi Okino, all of Kanagawa, Japan

[73] Assignee: Canon Kabushiki Kaisha, Japan

[21] Appl. No.: 774,792

[22] Filed: Sep. 11, 1985

[30] Foreign Application Priority Data

Sep. 12, 1984 [JP] Japan .................................. 59-190786

[51] Int. Cl.⁴ ............................................. H04N 5/238
[52] U.S. Cl. ..................................................... 358/228
[58] Field of Search ......................... 358/228; 352/141; 354/429, 432, 433, 446, 451, 453

[56] References Cited

U.S. PATENT DOCUMENTS 4,366,501 12/1982 Tsunekawa et al. ............ 354/432 X
4,558,368 12/1985 Aoki et al. ............................ 358/228

FOREIGN PATENT DOCUMENTS 12288 4/1972 Japan .................................... 358/228
126425 10/1979 Japan .................................... 358/228

Primary Examiner—W. B. Perkey
Attorney, Agent, or Firm—Toren, McGeady & Associates

[57] ABSTRACT

In an image sensing apparatus having an image sensor which converts an optical image of an object into an electrical signal, a view finder for monitoring the optical image equivalent to the image incident on the image sensor, an optical member arranged in the path of light incident on the image sensor to selectively guide the light to the image sensor and also to the view finder, an exposure member which is at least partially disposed in between the object and the optical member and is arranged to control an exposure and a light receiving element which is arranged separately from the image sensor, a control circuit is arranged to cause the light receiving element to form a first photometric information when the optical member guides the optical image to the view finder; to control the exposure member on the basis of the first photometric information while the optical image is led to the image sensor by the optical member; to cause, after that, the image sensor to form a second photometric information; and again to control the exposure member on the basis of the second photometric information.

15 Claims, 3 Drawing Figures

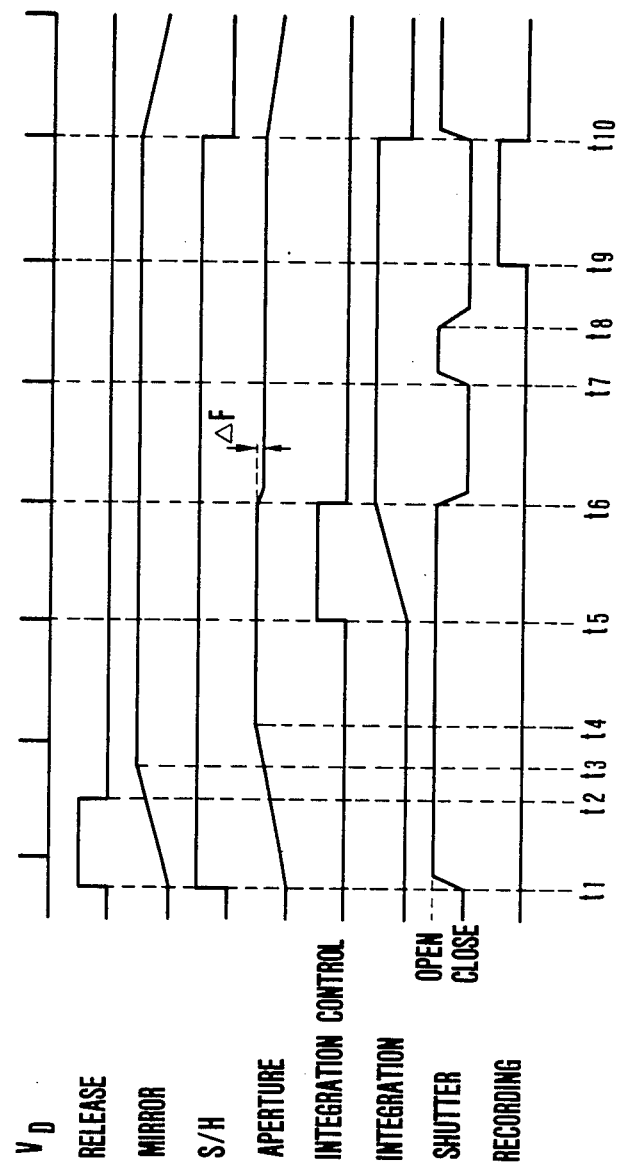

IMAGE SENSING APPARATUS

BACKGROUND OF THE INVENTION

1. Field of the Invention

This invention relates to an image sensing apparatus which is provided with an image sensor for converting an image of an object into an electrical signal and is capable of obtaining highly accurate photometric information.

2. Description of the Prior Art

The conventional video cameras include a kind using a solid-state image sensor such as a CCD or the like. The solid-state image sensor is usable not only for the image purpose but also for a photometric purpose. With such a solid-state element used for the latter purpose, however, it takes an excessively long period of time in obtaining an apposite aperture value by driving a stop member or iris in the event of an excessive degree of deviation of the aperture position of the stop member from the apposite aperture value.

To solve this problem, Japanese Patent Application No. SHO 57-214408 disclosed a system wherein a solid-state image sensor is employed for the photometric purpose in combination with a silicon photo-cell (hereinafter referred to as SPC) which has a broader photometric range than the solid-state image sensor and the degree of exposure is controlled by the combination of the two elements. According to the arrangement disclosed by the above-cited patent application, a stop member is roughly adjusted beforehand to an apposite aperture position (or a tentative aperture value) on the basis of a light quantity value measured by means of an SPC or the like prior to the normal operation of an image sensor and that of a shutter. After this preliminary aperture adjustment, the stop member is again controlled according to a light quantity measured by the image sensor to bring it to an apposite aperture value. The aperture control is thus accomplished in two steps.

However, in case that the video camera arranged according to the above-cited prior art arrangement is to be applied to an image sensing apparatus of the kind permitting a still picture taking operation and use of an interchangeable lens in combination with an optical view finder, there arises the following problems. It is preferable for the apparatus of this kind to have a bright view finder for the purpose of determining a composition of the still picture to be taken befor an actual picture taking operation. Whereas, it is hardly possible to obtain such a bright view finder in accordance with the prior art arrangement cited above.

SUMMARY OF THE INVENTION

It is an object of this invention to provide an image sensing apparatus which is capable of solving the above-stated problem of the prior art arrangement by giving a bright view finder and yet permits a highly accurate photometric operation.

To attain this object, an embodiment of this invention is provided with a control means which is arranged to cause light receiving means to form first photometic information when an optical image is led to a view finder by light guiding means; to control exposure means on the basis of the first photometric information while the optical image is led also to an image sensor by the light guiding means; to cause the image sensor to form second photometric information; and then to again control the exposure means on the basis of the second photometric information. The embodiment thus obviates the necessity of performing exposure control while a picture image is being monitored at the view finder. Further, since the incident light is selectively guided, for example, by a total reflection mirror, such as a quick return mirror to the view finder and also to the image sensor, the picture or image plane of the view finder can be very brightly arranged.

Further, with the embodiment of this invention arranged to preliminarily control the exposure means on the basis of the first photometric information when an optical image is led to the image sensor by the light guiding means, the incident light quantity can be brought within the dynamic range of the image sensor. After that, the second photometric information can be very quickly formed by the output of the image sensor. Besides, since the accuracy of the second photometric information is extremely high, image information of adequate brightness or luminance can be obtained.

The above and further objects and features of this invention will become apparent from the following detailed description of a preferred embodiment thereof taken in connection with the accompanying drawings.

BRIEF DESCRIPTION OF THE DRAWINGS

FIG. 3 is a timing chart showing the operation of the embodiment shown in FIG. 1.

DETAILED DESCRIPTION OF THE PREFERRED EMBODIMENT

Figure 1:
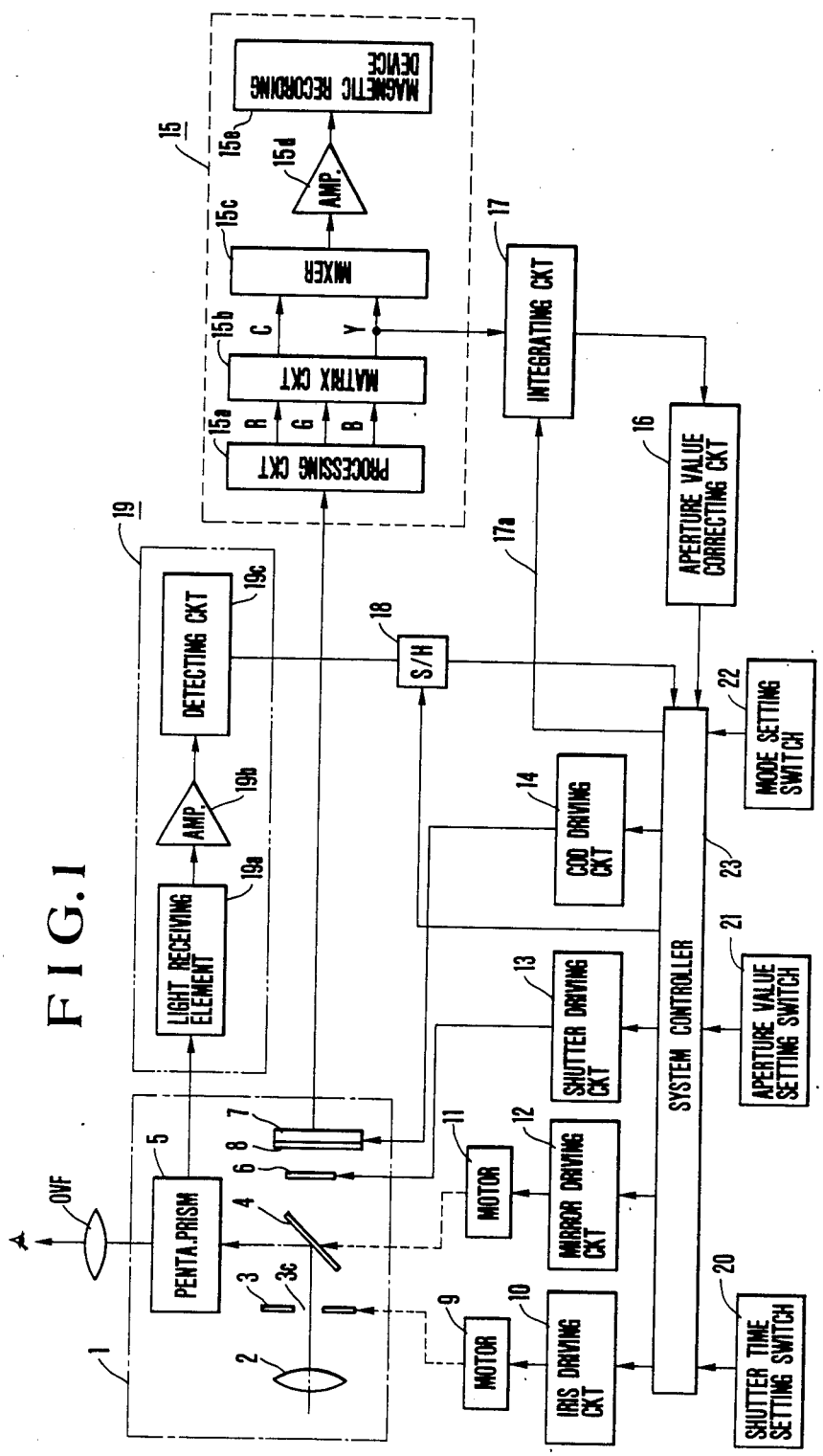
FIG. 1 is a block diagram showing a preferred embodiment of this invention.
Figure 2:
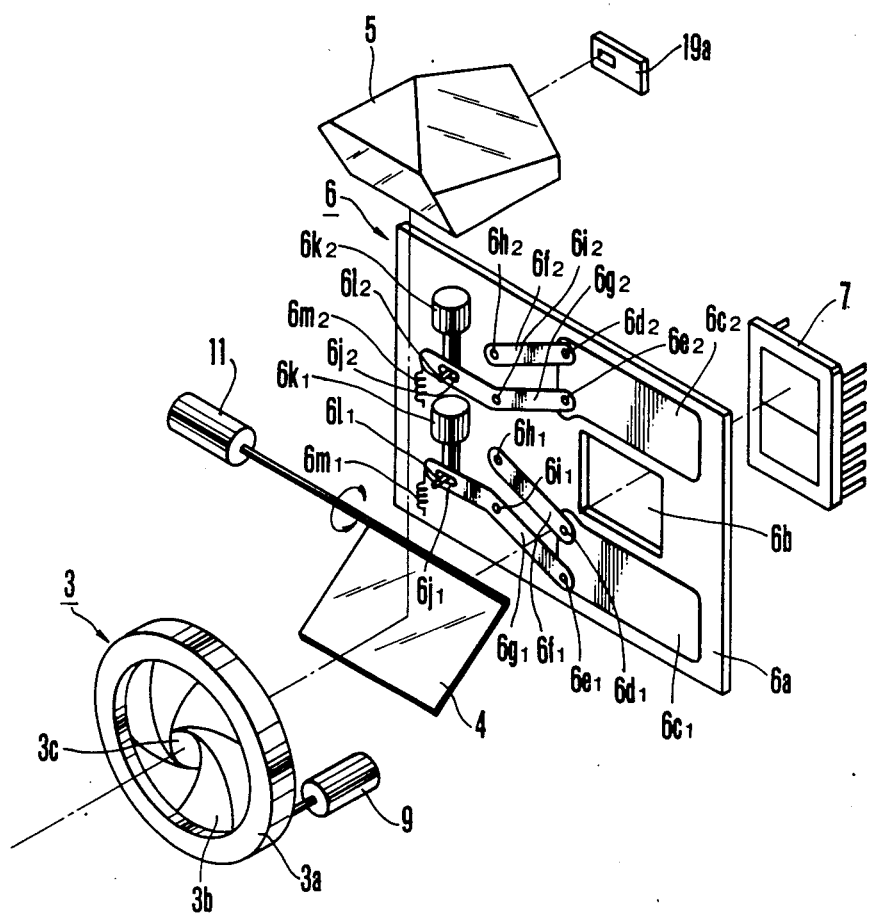
FIG. 2 is an exploded oblique view showing a single-lens reflex camera to which the embodiment of this invention is applied.

A preferred embodiment of this invention is arranged as described with reference to the accompanying drawings, wherein:

FIG. 1 is a block diagram showing the embodiment and FIG. 2 an exploded oblique view showing an image sensing apparatus to which the same embodiment is applied. Referring to these drawings, an optical system 1 is composed of a lens 2; a stop or iris member 3 which serve as exposure means; a quick return mirror 4 which serves as light guiding means; a pentagonal roof type prism 5; a shutter 6; a CCD 7 which serves as image sensing means; a color separation filter 8 arranged to cover the image sensing face of the CCD 7; and an eyepiece OVF arranged to serve as view finder which permits the operator to monitor light coming via the pentagonal roof type prism 5. The light guiding means may be composed of a combination of an electro-optical shutter and a half mirror or the like arranged to selectively guide the light. Further, the image sensing means may be any image sensor that is capable of converting an optical image into an electrical signal. The above-stated stop member or iris 3 is composed of an iris blade unit 3a and iris blades 3b. A motor 9 is mounted on the iris blade unit 3a and is arranged to be driven by an iris driving circuit 10 to control the area of an aperture 3c. Another motor 11 is mounted on the above-stated quick return mirror 4. A mirror driving circuit 12 drives the motor 11 to control the turning movement of the quick return mirror 4. The shutter 6 is arranged as shown in FIG. 2. A shutter base plate 6a is 4. The shutter 6 arranged as shown in FIG. 2. A shutter base plate 6a is provided with an aperture 6b. A leading shutter blade 6c1 and a trailing shutter blade 6c2 are arranged to move one after the other toward the center line of the aperture 6b to cover the aperture 6b until they overlap each other on the center line. Arms 6f1 and 6g1 have their end parts pivotally mounted on one end of the leading blade 6c1 by means of pins 6d1 and 6e1, respectively. The other end of the arm 6f1 and the middle of the arm 6g1 are pivotally mounted on the shutter base plate 6a by means of pins 6h1 and 6i1, respectively. A parallel link mechanism is thus formed by this arrangement. Further, the other end of the arm 6g1 is provided with a slot 6j1. A pin 6l1, which is mounted on an electromagnet 6k1, is inserted into the slot. A spring 6m1 is attached to the fore end of this arm 6g1 and is arranged to urge the arm to turn counterclockwise on the pin 6i1 as viewed on the drawing.

Arms 6f2 and 6g2 are likewise pivotally attached to one end of the trailing blade 6c2 by pins 6d2 and 6e2. The other end of the arm 6f2 and the middle part of the arm 6g2 are also pivotally attached to the shutter base plate 6a via pins 6h2 and 6i2, respectively. These parts also jointly form a parallel link mechanism. Meanwhile, the other end of the arm 6g2 is provided with a slot 6j2. A pin 6l2 which is mounted on another electromagnet 6k2 is inserted into the slot 6j2. A spring 6m2 is attached to the fore end of the arm 6g2 and is arranged to urge the arm 6g2 to turn counterclockwise on the pin 6i2.

The filter 8 mentioned in the foregoing is, for example, a stripe filter which consists of three primary color stripes of red, green and blue.

A recording system 15 is arranged to include a processing circuit 15a, a matrix circuit 15b, a mixer 15c, an amplifier 15d and a magnetic recording device 15e. The processing circuit 15a is arranged to divide and separate the output of the CCD 7 into primary color signals R, G and B. The matrix circuit 15b is arranged to convert each of the primary color signals into a chrominance signal C and a luminance signal Y. The mixer 15c is arranged to mix and convert the chrominance and luminance signals C and Y into a signal suited for recording. The magnetic recording device 15e is arranged to record the output of the mixer 15c.

An aperture value correcting circuit 16 is arranged to compare with an apposite level, the luminance signal Y, which has been integrated in integrating circuit 17 over a predetermined period of time, and to compute an apposite aperture value. A photometric circuit 19, which serves as light measuring means, includes a light receiving element 19a. Light incident on the light receiving element 19a is photo-electric converted by the element 19a. An electrical signal obtained by this photoelectric conversion is supplied via an amplifier 19b to a detecting circuit 19c. The circuit 19c then measures the quantity of light incident on the element 19a. A sample-and-hold circuit 18 serves as storing means to store the output of the detecting circuit 19c at a predetermined timing. A shutter time setting switch 20 is arranged to have a shutter time value set thereby in the case of a shutter speed preference mode. An aperture value setting switch 21 is arranged to have an aperture value set thereby in the event of an aperture preference mode. A mode setting switch 22 is arranged to permit selection of the shutter preference mode, the aperture preference mode, or some other mode, if any. A system controller 23 is arranged to serve as control means for controlling the sequence of operations of the electrical system of the image sensing apparatus.

Referring now to a timing chart of FIG. 3, the operation of the embodiment which is arranged as described above is as described below:

Light Measurement: Before a shutter release button, which is not shown, is operated, light coming from an object is allowed to pass through the lens 2 and the aperture 3c of the iris which is in a full open state. The light from the object is then led to the pentagonal roof type prism 5 via the quick return mirror 4. A portion of the light then comes to illuminate the light receiving surface of the light receiving element 19a. Another portion of the light is led to the eyepiece OVF which is provided for the view finder. The light receiving element 19a then produces a signal in proportion to the quantity of the light incident thereon. The detecting circuit 19c receives this signal via the amplifier 19b. The circuit 19c thus detects first photometric information. At the system controller 23, the setting value of the shutter time setting switch 20 and/or that of the aperture value setting switch 21 is computed according to information on the light quantity detected and the mode selected by the mode setting switch 22. An aperture value and/or a shutter speed or time value is thus obtained.

Further, before the operation on the shutter release button, the electromagnets 6k1 and 6k2 have no power supplied thereto and the aperture 6b of the shutter 6 is covered solely by the leading blade 6c1. In this instance, according to this invention, the view finder is very bright as the iris is fully open.

Photo Taking: Next, with the mode setting switch 22 set in a position of selecting the shutter time preference mode, when the shutter release button is operated at a point of time t1 indicated in FIG. 3, the system controller 23 immediately produces signals, including: A mirror up signal for uplifting the quick return mirror 4; an iris driving signal for driving the stop member of iris 3; a shutter opening signal for causing the shutter 6 to open; and a hold signal for causing the sample-and-hold circuit 18 to perform a holding operation. These signals are applied, respectively, to the mirror driving circuit 12, the iris driving circuit 10, the shutter circuit 13 and the sample-and-hold circuit 18.

In response to this, the mirror driving circuit 10 drives the motor 9 to uplift the quick return mirror 4 away from a photo-taking optical path (at a point of time t3). Following that, the output of the detecting circuit 19c is held. A computed aperture value is then held within the system controller 23. The iris blades 3b are stopped down according to the computed aperture value. The shutter 6 is opened by the shutter driving circuit 13. More specifically, when the electromagnets 6k1 and 6k2 are energized, the pin 6l1 which is inserted in the slot 6j1 moves upward as viewed on FIG. 2 and causes the arm 6g1 to turn clockwise against the urging force of the spring 6m1. The clockwise turn of the arm 6g1 retracts the leading shutter blade 6c1 from the aperture 6b. As a result, the CCD 7 is illuminated by the light from the object to have an image of the object formed there.

With the object thus imaged on the CCD 7, the CCD 7 produces a time series according to light quantity distribution on the CCD 7. This signal is then divided and separated into the primary color signals R, G and B. The matrix circuit 15b then converts the primary color signals into chrominance and luminance signals C and Y. The luminance signal Y is supplied via the integrating circuit 17 to the aperture value correcting circuit 16.

Then, in synchronism with a vertical synchronizing signal, which is produced at a point of time t5 after the point of time t3 at which the mirror completes its move and another point of time t4 at which the stopping down action on the iris is completed, the integrating circuit 17 receives an integration control signal 17a. Upon receipt of the signal 17a, the integrating circuit 17 integrates the above-stated luminance signal Y over a period from the point of time t5 to a point of time t6 which represents one field period. By this integrating operation, the luminance of the whole image plane of the CCD 7 is detected. Then, information on the luminance thus detected (second photometric information) is compared with an apposite (reference) level at the aperture value correcting circuit 16, which thus determines an apposite aperture value.

The above-stated apposite (reference) level is normally set at a value obtained at about the middle part of the dynamic range of the CCD 7. A signal corresponding to the apposite aperture value is supplied to the system controller 23. Then, upon completion of the integrating operation of the integrating circuit 17 at the point of time t6, the system controller 23 supplies the iris driving circuit 10 with a signal for correcting the aperture of the iris as much as a value ΔF. In response to this signal, the iris driving circuit 10 drives the motor 9 to adjust the area of the aperture 3c to bring the iris 3 into an apposite aperture position at the time t6.

Further, at the point of time t6, the system controller 23 supples the shutter driving circuit 13 with a shutter closing signal for closing the shutter 6. In response to the signal, the shutter driving circuit 13 cuts off power supply to the electromagnet 6k1 to cause thereby the aperture 6b to be covered with the leading shutter blade 6c1.

After that, in synchronism with the timing of the vertical synchronizing signal VD of the CCD driving circuit 14, the power supply to the electromagnet 6k1 is resumed at a point of time t7 and power supply to the other electromagnet 6k2 effected at another point of time t8. Then, the leading shutter blade 6c1 moves away from the aperture 6b at the shutter time interval (t8–t7) preset at the switch 20. Concurrently with the retraction of the leading blade 6c1, the trailing blade 6c2 comes to cover the aperture 6b of the shutter.

An image thus sensed is divided into a chrominance signal C and a luminance signal Y within the recording system 15 during a period between points of time t9 and t10. These signals are then supplied via the mixer 15c and the amplifier 15d to the magnetic recording device 15e to be recorded there. With an exposure thus having been effected for a predetermined shutter time, when the image sensing (or photo-taking) operation comes to an end, the system controller 23 supplies the mirror driving circuit 12 and the iris driving circuit 10 with signals for bringing the image sensing apparatus back to its original condition. In response to this, the mirror driving circuit 12 and the iris driving circuit 10 drives the quick return mirror 4 and the iris or stop member 3 via the motors 11 and 9, respectively.

The quick return mirror 4 comes back to its original position, accordingly. The light from the object is then led to the light receiving element 19a via the mirror 4 and the pentagonal roof type prism 5. Meanwhile, the iris 3 resumes a full open position. The holding action of the sample-and-hold circuit 18 comes to a stop. The integrating circuit 17 is reset. Thus, in accordance with the arrangement of this specific embodiment, various component elements are brought back to their original positions respectively. This arrangement effectively prevents noises from being mixed in the recording signal.

What is claimed is:

1. An image sensing apparatus comprising:
   image sensing means arranged to convert an optical image of an object into an electrical signal;
   monitor means arranged to permit monitoring image equivalent to said optical image incident on said image sensing means;
   light guiding means arranged in the path of light incident on said sensing means to selectively guide the light of the object to said image sensing means also to said monitor means:
   exposure means for controlling an accumulation amount of said electrical signal;
   light receiving means arranged separately from said image sensing means; and
   control means arranged to cause said light receiving means to form a first photometric information during a time when said optical image is led to said monitor means by said light guiding means, to hold said first photometric information as said optical image is led to said image sensing means by said light guiding means to control said exposure means on the basis of said first photometric information until a second photometric information is formed, and to cause, after that, said image sensing means to form said second photometric information and then to again control said exposure means on the basis of said second photometric information.

2. An apparatus according to claim 1, wherein said light guiding means includes a mirror.

3. An apparatus according to claim 2, further comprising mirror driving means arranged to displace said mirror.

4. An apparatus according to claim 1, further including trigger means arranged to shift said light guiding means between a first state, in which said light from the object is led to said monitor means, and a second state, in which said light from the object is led to said image sensing means.

5. An apparatus according to claim 4, wherein said exposure means includes an iris which is arranged to be fully opened to allow the light from the object to be led to said monitor means while said light guiding means is in said first state.

6. An apparatus according to claim 4, wherein said exposure means includes a shutter which is arranged to shield the front surface of said image sensing means from light while said light guiding means is in said first state.

7. An image sensing apparatus comprising:
   (a) an optical system arranged to guide light coming from an object;
   (b) light quantity limiting means arranged to limit the light coming through said optical system;
   (c) light guiding means arranged to selectively guide the light coming through said light quantity limiting means to a first part or a second part;
   (d) image pick-up means arranged at said second part to pick up an image of the object;
   (e) first means arranged to form information on the luminance of said object while said light from the object is led to said first part by said light guiding means;
   (f) second means arranged to cause said image pick-up means to form information on the luminance of said object while said light from the object is led to said second part by said light guiding means;

(g) memory means for holding said information formed by said first means in response to said light from the object being second part, and for controlling said light quantity limiting means on the basis of said information held by said memory means until said information is formed by said second means.

8. An apparatus according to claim 7, further comprising monitor means arranged at said first part to permit observation of an image of said object.

9. An apparatus according to claim 8, wherein said monitor means includes an optical view finder.

10. An apparatus according to claim 7, wherein said light quantity limiting means includes an iris.

11. An apparatus according to claim 7, wherein said light guiding means includes a mirror.

12. An apparatus according to claim 7, wherein said first means has a wider dynamic range for light than said image pick-up means.

13. An apparatus according to claim 12, wherein said first means includes a silicon photo cell.

14. An apparatus according to claim 7, further comprising control means arranged to control the quantity of light incident on said image pick-up means on the basis of the outputs of said first and second means.

15. An apparatus according of claim 14, wherein said control means is arranged to control said incident light quantity on said image pick-up means on the basis of the output of said first means and, after that, to again control the incident light quantity on said image pick-up means on the basis of the output of said second means.

* * * * *